March 16, 1926.
S. A. HAMNETT
SEAL
Filed April 20, 1925
1,576,741
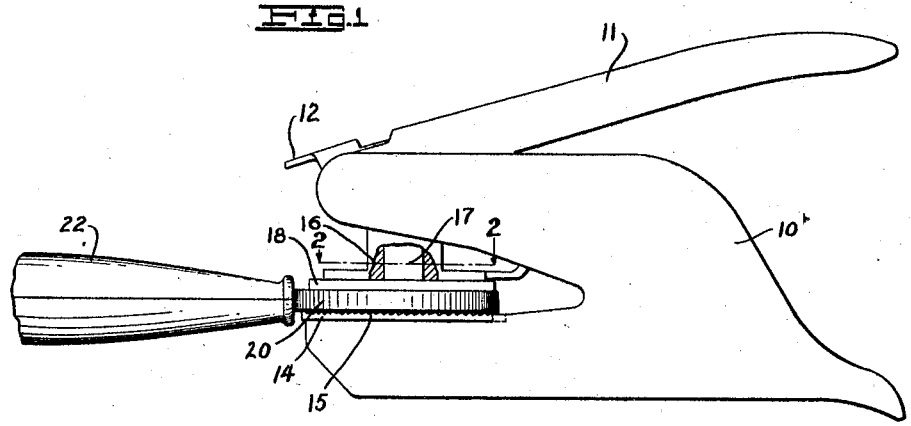
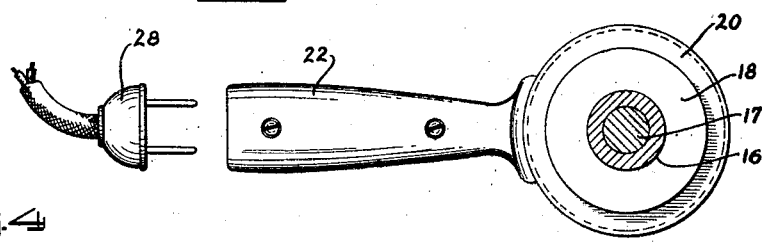
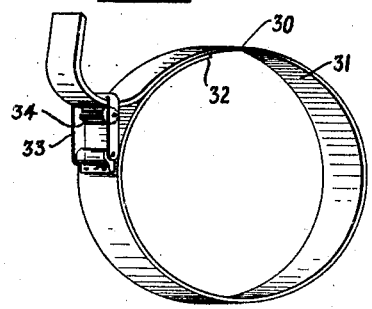
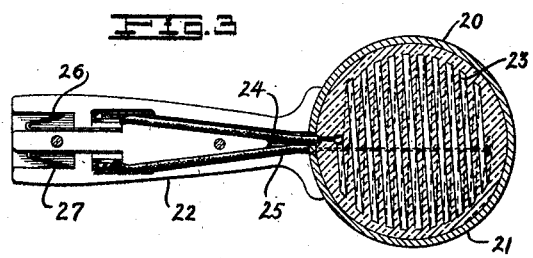
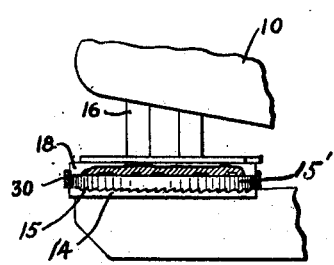
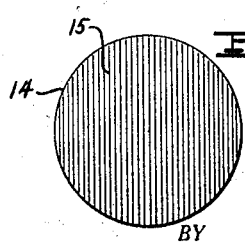
INVENTOR.
S. A. HAMNETT
BY
ATTORNEY.

Patented Mar. 16, 1926.

1,576,741

UNITED STATES PATENT OFFICE.

SAMUEL A. HAMNETT, OF LOS ANGELES, CALIFORNIA.

SEAL.

Application filed April 20, 1925. Serial No. 24,455.

*To all whom it may concern:*

Be it known that I, SAMUEL A. HAMNETT, a citizen of the United States, residing at Los Angeles, in the county of Los Angeles and State of California, have invented a certain new and useful Improvement in Seals, of which the following is a full, clear, and exact description, reference being had to the accompanying drawings.

This invention relates to a method and apparatus for use in the manufacture of seals such as are used by notary publics, corporations, etc.

The general object of the invention is to provide an improved method and apparatus for use in manufacturing seals wherein economy of time and material is secured and whereby a more efficient article can be produced.

A further object of the invention is to provide an improved method for use in manufacturing seals.

A further object of the invention is to provide an improved heating implement for heating the parts of a seal while manufacturing the same.

A further object of the invention is to provide an improved contractile band for use in manufacturing seals.

Other objects of the invention will be apparent from the following description taken in connection with the accompanying drawings wherein Fig. 1 is a side elevation showing my invention; Fig. 2 is a section on line 2—2, Fig. 1; Fig. 3 is a sectional view through the heating tool showing details of construction; Fig. 4 is a perspective view of the contractile band; Fig. 5 is a fragmentary detail partly in section and Fig. 6 is a plan, detail view of the base portion of the seal.

Referring to the drawings by reference characters, I have shown a seal at 10. This seal is provided with an operating handle 11 which may have a locking catch 12 thereon. The lower portion of the seal is shown as provided with a base 14 which may be round and may be provided with a roughened upper surface as at 15. This upper surface may be roughened by filing it or grooves may be arranged therein when the base is manufactured.

Above the base I show a movable plunger 16 which is provided with an aperture in which a shank 17 of a die 18 is mounted. The die 18 is provided with characters in its lower face.

In manufacturing seals the operating part is usually made by factories who supply the seal maker. Upon receipt of an order the seal maker proceeds to have the movable die 18 manufactured with the characters in relief. When this die is made it is inserted in the portion 16.

After this die has been arranged in place a heating tool 20 is inserted between the die and the base and the handle 11 operated to bring the parts into close contact, to heat the die and base.

The heating member as here shown preferably comprises a tubular body portion 21 and a handle 22. The body portion 21 is preferably circular in cross-section and is provided with a heating element 23 therein. This heating element is connected to two terminals 24 and 25 which engage circuit closure members 26 and 27 respectively. A plug 28 may be used to furnish electric current to the element 23.

When the heating element 20 has remained in the position shown in Fig. 1 sufficiently long to raise the temperature of the die 18 and the base 14 to the proper degree the heating element is withdrawn and a disc of material which is plastic when heated is placed on the base and beneath the die.

About this disc I place a contractile band 30. This band comprises a strip of metal or other material 31 having an end 32 located within the coil as shown in Fig. 4 while intermediate the length of the band I show a holding clip 33 which has a corrugated locking dog 34 thereon. The corrugated locking dog is eccentrically mounted so that it will grip the contractile band which is flexible and will hold it in position about the plastic disc 15′.

When the band is adjusted the handle 11 is moved so that the parts assume the position shown in Fig. 5 with the upper die 18 engaging the disc. The heat of the base and the upper die 18 renders the disc plastic so that the characters in relief on the disc 18 form coacting characters on the disc 15′, and at the same time portions of the plastic material enter the roughened parts 14 to hold the plastic disc, which has now become the lower die member, in place. After the characters have been formed in the disc and the entire device is allowed to cool it is then ready for use.

I now prefer to use material known as bakelite as the material from which the lower die members are constructed, although it will be understood that other material than bakelite may be used without departing from the spirit of my invention.

Having thus described my invention, I claim:

1. The method of making seals comprising taking a seal having a movable die thereon, arranging a heating element against said die, removing the heating element and arranging a disc which is plastic under heat, beneath said die, placing a band about said disc and bringing said die upon said disc to form characters in said disc.

2. The method of making seals comprising taking a seal having a base, and a movable die arranged adjacent said base, inserting a heating element between said die and said base to heat the die and the base, removing the heating element, inserting a disc which is plastic under heat, beneath said die, and bringing said die upon said disc to heat the latter and to form characters in said disc.

3. The method of making seals comprising taking a seal having a base thereon and having a movable die arranged adjacent said base, inserting a heating element between said die and said base to heat the die and the base, removing the heating element, inserting a disc which is plastic under heat, beneath said die, placing a band about said disc and bringing said die upon said disc to soften said disc and to form characters in said disc and to unite the disc to the base.

4. A step in the manufacture of seals having a base member and having a die member movable toward said base member, said step comprising first arranging a heating element upon one of said members, then heating said element to cause it to heat the member on which it is arranged, then removing the element, placing material which is rendered plastic under heat between the members and bringing the movable die member into engagement with the plastic material.

5. A step in the manufacture of seals having a base and having a die movable toward said base, said step comprising first inserting a disc which is plastic under heat between said die and said base, surrounding said disc with a retaining band and moving the movable die into engagement with the disc, rendering the disc plastic and thereafter removing the band.

In testimony whereof, I hereunto affix my signature.

SAMUEL A. HAMNETT.